United States Patent Office 3,712,862
Patented Jan. 23, 1973

3,712,862
WELL TREATING FLUID AND METHODS
Charles O. Bundrant, Charles R. Hainebach, and Frank H. Mayo, Houston, Tex., assignors to Champion Chemicals Inc., Houston, Tex.
Continuation of abandoned application Ser. No. 814,496, Mar. 17, 1969, which is a continuation-in-part of abandoned application Ser. No. 635,180, May 1, 1967. This application Oct. 16, 1970, Ser. No. 81,525
Claims priority, application Canada, Feb. 13, 1967, 982,743
Int. Cl. C23f 11/00, 11/10
U.S. Cl. 252—8.55 E
10 Claims

ABSTRACT OF THE DISCLOSURE

A weighted liquid corrosion inhibiting formulation for use in oil wells containing a water insoluble organic iron corrosion inhibitor, an aqueous solution of a water soluble weighting agent and a coupling agent such as a lower alcohol. The soluble weighting agent may be, for example, an ammonium salt, phosphoric acid, a polyol, sugar, or certain organic acids.

CROSS-REFERENCE TO RELATED APPLICATIONS

This application is a continuation of prior application Ser. No. 814,496, filed Mar. 17, 1969, now abandoned, which was a continuation-in-part of prior application Ser. No. 635,180, filed May 1, 1967, now abandoned, entitled, Well Treating Fluid and Methods, which was filed under the convention claiming the priority of Canadian application No. 982,743, filed Feb. 13, 1967.

This application is related to prior copending application Ser. No. 528,764, filed Feb. 21, 1966, entitled Well Treating Fluid and Corrosion Inhibitor, assigned to the same assignee as the present application, now abandoned in favor of application Ser. No. 634,967, filed May 1, 1967, which has been abandoned in favor of application Ser. No. 770,130, filed Oct. 23, 1968, now abandoned, entitled, Well Treating Fluid and Methods.

BACKGROUND OF THE INVENTION

(a) Field of invention

This invention pertains to treatment of well pipes and associated apparatus to prevent corrosion thereof, to inhibitor formulations and methods of preparation of inhibitor formulations, to weighting materials, and the coupling thereof to inhibitor formulations to produce well treatment fluid, i.e., in liquid vehicle form, and to methods of utilization of such treatment fluid.

(b) Discussion of prior art

It is known to protect well pipes against corrosion by means of organic corrosion inhibitors including carboxylic acids (e.g., mono-, di-, and tri-carboxylic acids) and ammoniacal compounds (e.g., amines, diamines, imidazolines, amine polymers, amidoamines, oxazolines). Some of these organic inhibitors are disclosed, for example, in U.S. Pats. 2,466,517 to Blair et al.; 2,466,530 to Blair et al.; 2,468,163 to Blair et al.; 2,598,213 to Blair; 2,599,-385 to Gross et al.; and 2,756,211 to Jones.

Blair ('517) discloses that iron corrosion can be prevented by inhibitors belonging to the general class of cyclic amidines and in particular the substituted imidazolines, in which the imidazoline molecule contains at least one aliphatic or cycloaliphatic hydrocarbon group containing from 8 to 32 carbon atoms, and notes that imidazolines in which the 2-carbon atom is substituted by a long chain aliphatic hydrocarbon group are particularly easy to prepare and are very effective for prevention of corrosion. In addition, he discloses that particularly outstanding corrosion preventive reagents result when the imidazoline compound contains basic nitrogen groups in addition to those inherently present in the imidazoline ring. He notes that the preparation of imidazoline substituted in the 2-position by aliphatic hydrocarbon radicals is well described in the literature, and that same may be readily carried out by reaction between a monocarboxylic acid and a diamine, or polyamine, containing at least one primary amino group and at least one secondary amino group, or another primary amino group, separated from the first primary amino group by two carbon atoms. Examples of suitable amines include diethylene triamine, triethylene triamine, tetraethylenepentamine, etc. He notes further that when an aliphatic or cycloaliphatic carboxylic acid containing 9 or more carbon atoms is reacted with such an amine the resulting imidazoline will contain a 2-substituent consisting of an aliphatic hydrocarbon radical containing 8 or more atoms. For example, if such an acid is reacted in equal mole proportions with one of said amines at a temperature of 250° C. or higher, the resulting condensation product will be the desired imidazoline having the general formula where X will contain an amino group, and A will be an alkyl group of $C_8$ to $C_{32}$. He includes as an example of a suitable inhibitor the compound 1-aminoethyl, 2-heptadecylimidazoline.

Blair ('517) further discloses that polyheterocyclic compounds may also be used for inhibitors, e.g., if one reacts one mole of tetraethylene pentamine with stearic acid, $CH_3(CH_2)_{16}CO_2H$, and then reacts thus further with another mole of a carboxylic acid at a suitable high temperature, a di-imidazoline is obtained.

As noted in 54 Chem. Rev. 594, the term glyoxaline was originated in 1858 by De Bus, who obtained from glyoxal and ammonia a compound possessing an imidazole structure. The term provides the root for the word glyoxalidine, referring to the common 2-alkyl 2-imidazoline.

Blair ('517) further discloses that his imidazoline inhibitor may be compounded with any of various acids, including, e.g., oleic acid $(C_{18}H_{34}O_2)$ and abietic acid $(C_{20}H_{36}O_2)$ to form a salt that is a desirable inhibtor.

In his patent ('163), filed the same day as said '507 patent, Blair describes other related imidazoline inhibitors and in his earlier filed patent ('530) he described the use of N-aliphatic-2-5-pyrrolinediones as inhibitors.

In his later filed patent ('213), Blair describes the use of basic amides and polyamines containing two or more nitrogen atoms for the purpose of inhibiting corrosion. He discloses that the alkyl radical may be obtained from the higher molecular weight carboxy acids, e.g., those containing from 6 to 40 carbon atoms, and including carboxy acids produced by the oxidation of petroleum.

Gross discloses that oxidized mineral waxes, or petroleum wax oxidates as they are sometimes called, e.g., the oxidates of paraffin wax, which are themselves useful inhibitors, may be used to hold an imidazoline inhibitor to a solid weighting material to form a weighted stick inhibitor.

Jones ('211) points out that when a high molecular weight carboxylic acid of 10 to 20 carbon atoms per molecule, such as those obtained from the liquid phase partial oxidation of petroleum fractions, is reacted with an amine type inhibitor, the resulting salt or complex gives superior protection, the petroleum oxidate acid portion giving protection to the anodic surfaces and the amine type inhibitor giving protection to the cationic surfaces of the metal to be protected.

In the use of such organic inhibitors it is customary, as disclosed in the aforesaid U.S. patents, to arrange that the inhibitor reach the bottom of the well so that the full length of the well pipe is contacted by and protected with the inhibitor. To this end, in order to avoid the use of pumping equipment to pump the inhibitor down the well pipe to the well bottom, which sometimes represents over 50 percent of the cost of the usual treatment job, it has been proposed to add to the inhibitor a weighting material to carry it quickly by gravity to the bottom of the well. Some difficulty may be experienced with known weighting materials. Stick type weighted inhibitors tend to hang up in couplings and thus fail to reach bottom. Solid weighting materials also tend to clog up chokes when delivered into the well fluid. Some weighting materials are undesirable because they will poison the catalysts used at the refineries. Certain inhibitor-weighting material emulsions tend also to create oil-water-emulsions of the well fluid necessitating extra expense to treat and break the well fluid emulsion. Low and medium density liquid weighted treating materials, i.e., those of a density less than saturated well brine, fail to fall rapidly or at all through columns of oil or high pressure gas and will not fall through heavy brines.

An organic iron corrosion inhibitor suitable for periodic well treatment should have a solubility of less than 3 percent in distilled water at 75 degrees Fahrenheit, absent such additives as alcohols, surfactants, coupling agents, and the like. These materials may be referred to as water insoluble organic corrosion inhibitors. Insolubility in water is a highly desirable property for a corrosion inhibitor intended for only periodic application to a well, for a water soluble* product would be quickly washed away by the flow of well fluid. Preferably the inhibitor is less than 10% soluble in diesel oil but is sufficiently dispersable to promote even distribution of the inhibitor over the surfaces to be protected, and to help prevent clogging of equipment by excess inhibitor flowing with the well fluid. The inhibitor is preferably in liquid form and in all of the examples set forth hereinafter the inhibitor is a liquid, although it would seem that in some cases solid inhibitors could be used.

Another factor influencing the necessity of the inhibitor being water insoluble is the fact that it is to be weighted to fall to the bottom of the well where it is then released to float back to the oil water interface. If the inhibitor were water soluble it would dissolve in the brine at the well bottom and would be largely lost as far as protection of other parts of the well is concerned.

As previously noted, it has been proposed, e.g., as disclosed in Pat. 2,839,465 to Jones, to emulsify a corrosion inhibitor with the brine of well fluid. This procedure has a number of disadvantages including the fact that considerable manpower is required at the well site to accomplish the emulsification, the emulsion will not break if too tight and hence will protect nothing or, if the emulsion is not tight enough the inhibitor will merely dissolve in the annulus well fluid without entering the tubing, and in any event emulsifying a low density inhibitor with well fluid will never produce an emulsion having a density greater than the well fluid.

The use of a medium density well treatment fluid including a water soluble, non-dispersible in oil, corrosion inhibitor dissolved in brine, plus a light metal salt weighting solution, plus enough water to render them consolute, in the injection stream of water flooded wells, has been described in U.S. Pat. 2,999,811 to Schell, the inhibitor being added continually over a period of weeks; it has been suggested therein that such material may be used in gas condensate wells and possibly in other down the well applications. However, such material would be unsuitable for periodic treatment of wells due to the water solubility and nondispersibility in oil of its inhibitor component and would be inapplicable to down the hole treatment through brine due to its low density.

The use of a well treatment fluid including an oil soluble corrosion inhibitor rendered oil immiscible by a hydrophylic agent and weighted with an organic halide mutual solvent is described in U.S. Pat. 2,822,330 to Riggs. Such an inhibitor is not suited for applicant's purpose wherein the well flow is to be connected or carried to a refinery since even minute amounts of organic halides will poison refinery catalysts. Oil company specifications may forbid in excess of 4 parts per billion of such organic halides. It is apparent that the use of an organic halide as required to dissolve an oil soluble inhibitor that has been rendered oil immiscible with a hydrophylic agent is not a satisfactory solution of applicant's problem of weighting a water insoluble, oil insoluble or oil dispersable corrosion inhibitor so that it can be applied to well pipes whose output is connected or carried to a refinery.

As previously noted, the inhibitor portion of the treating material according to the invention is intended to separate from the weighting component after the treating material has fallen into the brine in the well bottom, and thereafter the inhibitor portion is to rise through the brine to the oil-water interface. To this end the inhibitor is water insoluble but the weighter is water soluble. The treating materials of the aforementioned Schell and Riggs patents are unsuited to applicant's purpose, both components of the Schell material being soluble in water and both components of the Riggs material being insoluble in water.

In Pat. No. 2,785,127 to Shock et al. there are disclosed liquid weighted inhibitor materials but in one case the inhibitor and weighter are both said to be water soluble as in the Schell patent. In the other case the water insoluble inhibitor is mixed in the weighting material itself rather than being coupled with a solution thereof; a shelf stable high density material is not obtained.

The aforementioned prior application Ser. No. 528,764 filed Feb. 21, 1966, discloses well treating fluid composed of water insoluble, preferably oil dispersible, organic, iron corrosion inhibitor, including carboxylic acid and an ammoniacal compound, dispersed in a solvent system coupled to weighting material composition including a weighting material selected from a group of metal salts, which can be made heavy enough to fall through brine. Such fluid is well suited for treating most wells. However, in some wells, treating fluid incorporating, for example, a metal salt weighting material including zinc chloride, will cause excessive emulsification of the oil and water of the well fluid. According to the present invention there is provided a treating fluid generally similar to that of the aforesaid prior application but including a weighting material selected from a group of materials such that the resulting treating fluid is compatible with use even in sour wells.

SUMMARY OF THE INVENTION (a) Method of treating wells

The treating fluid embodying the present invention is especially useful in connection with pumping wells having fluid communication between the tubing and annulus. In ---
*Absent couplers, mutual solvents, and the like.

such wells there is usually an oil-water interface near the bottom of the well adjacent the ports in the tubing that place the annulus in communication with the tubing. The treating fluid of the present invention has the special property that after being dumped into the annulus it will fall through the oil without separation but after it has fallen through the water the inhibitor will separate from the weighting material and float back to the oil-water interface. In the usual case this separation will be effected within a period of 24 hours. At the interface the inhibitor is close to the tubing ports through which it enters the tubing and quickly diffuses into the tubing fluid. On the other hand, the treating fluid is fully stable in storage, remaining coupled and clear in the container for as much as 3 to 12 months.

This is in complete contrast to such prior art teachings as Kontol 118 mixed 50–50% or 25–75% with ethylene glycol, a turbid suspension which separates after five or ten minutes or a treating fluid comprising sodium polydodecylbenzene sulfonate in a dense sugar solution, such a fluid falling through oil and brine and resting on bottom without separation or appreciable corrosive inhibiting effect.

(b) Well treating material

Briefly, according to the invention, a formulation of a water insoluble organic iron corrosion inhibitor having only a slight dispersibility in oil and including carboxylic acid or ammoniacal compound, preferably both, dispersed in a solvent system, is weighted with a primarily aqueous solution of one or more materials selected from the group including ammonium salts, phosphoric acids, sugar, and organic acids, the group materials being characterized by solubility or dispersibility in water, density in the range of 8.3 to about 15 lb./gal., or even higher, lack of uncontrollable corrosiveness, lack of formation of damaging products with well fluid, compatibility with sour well fluid without excessive emulsification thereof, and preferably low cost, the foregoing formulation and weighting material being bound together by suitable coupling agent tending to prevent separation of the inhibitor formulation and weighting material. The resulting product may be described as being in liquid form, as distinguished from the solid stick type products of the prior art. The product releases the corrosion inhibitor in the presence of an excess of water. A sufficient amount of high density weighting material is used to insure a density in excess of that of saturated well brine, i.e. in excess of 9.9 lb./gal.

DESCRIPTION OF THE PREFERRED EMBODIMENTS

The inhibitor formulation will have a density of the order of 7 or 8 lb./gal., usually from 7.5 to 8.2 lb./gal. This is a density comparable to that of oil, usually about 7 to 8 lb./gal., ranging from 6.5 lb./gal. for gasoline and kerosene up to 8.3 for naphtha, but is less than that of water, fresh water having a density of 8.33 lb./gal. at room temperature and salt water ranging in density up to over 9 lb./gal.

The weighting material composition will have a density in the range of 8.33 to about 15 lb./gal. or over. In order to provide a treating fluid having a desired density higher than the density of the inhibitor formulation, the necessary amount of weighting material is added to the inhibitor formulation.

Treating fluids according to the invention may be divided according to density into three types:

(a) Low density fluid having a density in the range of 7.8 to 8.3, e.g., 8.25 lb./gal., which will fall through oil of the anticipated density but which will float in water at the oil-water interface.

(b) Intermediate density fluid having a density in the range of 8.33 to 9.9 lb./gal., which is heavier than oil but no heavier than saturated common salt water.

(c) High density fluid having a density of over 9.9 lb./gal., e.g., 10 or 12 lb./gal., intended to fall quickly through the water as well as the oil, followed by release of the inhibitor formulation which then floats back up to the oil-water interface. Treating fluids of even higher density, above 12 lb./gal., may be used.

Preferred treating fluids are of high density but in some uses a low density type of fluid may be required. Intermediate density fluids may be used in place of high density fluids because of peculiar well fluid conditions restricting the choice of weighting material, or for lower cost.

The following is an example of the composition by weight of a treating fluid that has been tested successfully in sour well fluid:

EXAMPLE I[1]

| Percent range | Percent | Item No. | Lbs. | Material | Abbreviation |
|---|---|---|---|---|---|
| 10–30 | 19 | 1 | 96 | Water | |
| 40–65 | 53 | 2 | 267 | Ethyl phosphoric acid | |
| 1/2–7 | 3 | 3 | 15 | Morpholine bottoms (Amine C–6, Jefferson Chemical Co.). | |
| 3–15 | 9 | 4 | 47 | Petroleum oil oxidate (TC 5926 Acid—Texaco). | POO |
| 2–12 | 6 | 5 | 31 | Butanol high boilers (Residue bottoms from production of butyl alcohol, e.g., as sold by Dow Chemical Co.). | BHB |
| | | 6 | ([2]) | Ammonia | |
| .25–5.0 | 1.5 | 7 | 7 | Crude N-hydroxyethyl-ethylene diamine, 75% to 95% strength (sold by Jefferson Chemical Co. as Amine AL–1). | HDA |
| 2–15 | 4.0 | 8 | 20 | Mixed di and tri aminoethyl glyoxaldines, 75% to 95% strength (sold by Retzloff Chemical Co. as Retzamine 211) (or resinous amines sold by Textilana as PR 7475). | AEG |
| .25–10 | 1.5 | 9 | 8 | Dodecyl benzene sulfonic acid neutralized with isopropyl amine (Retzanate 93—Retzloff Chemical Co.). | |

[1] All percent strengths and percent compositions in this and other examples are by weight.
[2] Sufficient to bring the pH of the above components 1–5 to 7.0.

From the ranges set forth above, it will be seen that the minimum concentration of corrosion inhibitor in the subject well treating fluid is 5.25% by weight.

The technical data sheet published in 1963 by Jefferson Chemical Company relative to its Amine C–6, the commercially available form of morpholine bottoms used in Example I (item 3), describes this material as follows:

Amine C–6, obtained as a co-product from a commercial continuous operation, is ac lear, dark-amber liquid composed primarily of a mixture of aliphatic and heterocyclic mono- and diamines. The morpholinyl ring is the dominant heterocyclic group present and the oxyethelene linkage appears very frequently in the various compounds present. Amine C–6 is completely miscible with water.

Functional analyses show the presence of primary and tertiary amine groups; essentially no secondary amine groups are present. Analytical data on a typical sample of Amine C-6 are given below:

| | |
|---|---|
| Titratable amine, meq./g. | 7.52 |
| Primary amine, meq./g. | 1.66 |
| Tertiary amine, meq./g. | 4.57 |
| Total nitrogen, meq./g. | 7.93 |
| Total acetylatable material, meq./g. | 7.02 |
| Specific gravity 20/20° C. | 1.078 |
| Viscosity, centistokes, 100° F. | 26 |
| Equivalent weight | 139.4 |
| Inorganic chloride | Nil |
| Water content, wt. percent | 0.08 |
| Color, Gardner (approx.) | 11 |
| Boiling range, ASTM. ° C. | |
| IBP | 242 |
| 5% | 249 |
| 95% (decomposition) | 310 |

Specifications:
Total titratable amine, meq./gm.—6.2 min.

Chemical constituents

Amine C-6 was subjected to a fractional distillation analysis. The fractions were then analyzed by a combination of vapor chromatographic analysis, titration analysis, functional group analysis, and infrared. Undoubtedly the three major compounds present are:

bis-2-(4-morpholinyl)ethyl ether — 37% wt.

4-(2-aminoethoxy)ethylmorpholine — 18% wt.

2-(4-morpholinylethoxy)ethanol — 11% wt.

These constituents represent approximately 65% wt. of the Amine C-6. Other amines which have been identified as present in small quantities are:

bis-(2-aminoethyl)ether
4-(2-aminoethyl)morpholine
2-(2-aminoethoxy)ethanol
dimorpholinoethane The technical sheet published in 1965 by Texaco, Inc. relative to its TC5926 acid, a commercially available form of petroleum oil oxidate which can be used for Example I, identifies it as being a "complex mixture composed primarily of organic acids and esters but also containing alcohols, ketones, hydroxy and keto acids, estolides, lactides and lactones." The same data sheet gives the properties of the petroleum oil oxidate as follows:

| | |
|---|---|
| Pounds/gallon at 60° F. | 8.9 |
| Viscosity at 210° F., SUS | 116 |
| Neut. No. | 160 |
| Sap. No. | 310 |
| Unsap., wt. percent | 15 |
| Flash, ° F. | 275 |

As noted in the aforementioned patents, the organic acids ( and esters thereof) resulting from the oxidation of petroleum components are of high molecular weight, e.g. in the range of $C_{10}$ to $C_{20}$.

TC5926 acid is made by oxidizing a petroleum oil, i.e., petrolatum. It is well known that in the oxidation of petroleum oil the resulting acids are substantially all mono acids. The neutralization number is the number of milligrams of KOH to neutralize one gram of the acid. Assuming a pure mono-acid, the molecular weight of TC5926 acid is therefore, on the average, 56.1 (the molecular weight of KOH) divided by 160 (the neut. no.) multiplied by 1000, which is 284. This corresponds to the monoacid $C_{17}H_{35}COOH$ which has a molecular weight of 284. As is also well known, the oxidation of petroleum breaks up the carbon chains. The typical molecular weight 284 is therefore actually achieved as the result of a mixture of lower and higher molecular weight acids ranging all the way from $C_2$ to $C_{40}$ acids, but typically in the range $C_{10}$ to $C_{30}$. Generally speaking, carboxylic acids in the range of 10 to 30 carbon atoms in the monomer are suitable for the acid component of the inhibitor formulation. Polymers of such acids may also be used.

The oxidation of petroleum oil to produce organic acid is well defined in the literature. See for example the aforementioned U.S. Pat. 2,756,211 to Jones et al. wherein it is stated at column 2, lines 50–55 that he uses "an organic acid falling within certain molecular weight ranges. For example, . . . acids produced by the liquid phase partial oxidation of kerosens in a process such as the Burwell process (as described in U.S. Pat. 1,690,769) have been found to be satisfactory."

At column 5, lines 22–42, Jones continues: "A mixture of acids (that) is preferred because the amine complexes do not tend to form emulsions or gels, is the mixture produced from normally liquid fractions of petroleum, such as kerosene, by liquid phase partial oxidation in a process such as that described in U.S. Pat. 1,690,769 in Burwell . . . . I have found . . . that the impurities such as alcohols, ketones, esters, and the like appear to exert a desirable demulsifying and degelling action and for that reason should be retained. Since only traces of light acids and heavy impurities are normally present in the oxidation products, the raw undistilled material, containing acids with average molecular weight of about 10 to 12 or more, may be employed as the acid source without purification."

Residue bottoms from the production of butyl alcohol, item 5 in Example I, is a commonly available material. A typical composition would include the following percentages by weight:

| | Percent |
|---|---|
| n Butanol | 3 |
| $C_5$ alcohols | 5 |
| $C_6$ alcohols | 10 |
| $C_7$ alcohols | 23 |
| $C_8$ alcohols | 45 |
| $C_9$ alcohols ⎫ | |
| $C_{10}$ alcohols ⎬ | 14 |
| $C_{11}$ alcohols ⎪ | |
| $C_{12}$ alcohols ⎭ | |
| | 100 |

The technical data sheet published by Jefferson Chemical Company relating to its Amine AL–1, the commercially available form of the Crude N-Hydroxyethylethylene diamine used in Example I, describes this material as follows:

Amine AL–1, obtained as a co-product from a commercial continuous operation, is a dark liquid composed of a mixture of aliphatic and heterocyclic polyamines. No aromatic derivatives are present.

Functional analyses show the presence of primary, secondary, and tertiary amines with no single type predominating. Although Amine AL–1 is not refined, these analyses will show only small variations from sample to sample. Analytical data on typical samples of Amine AL–1 are summarized below; where significant, a range of values is given:

Physical properties:
| | |
|---|---|
| Sp. gr. 20/20° C. | 1.028–1.033 |
| Viscosity, Gardner | H |
| Boiling range, ASTM. ° C.: | |
| IBP | 204–216 |
| 50% | 246–251 |
| 93% (with decomposition at) | 312 |

Chemical properties:

| | |
|---|---|
| Inorganic chloride, percent | <0.1 |
| Total nitrogen, percent | 29.7–30.8 |
| Amines, meq./gm. | |
| Primary (Van Slyke) | 7.3–8.3 |
| Secondary (Siggia) | 1.9–2.3 |
| Tertiary (Siggia) | 5.0–5.6 |
| Total amine [1] | 16.3–17.1 |
| Hydroxyl groups, meq. gm. | 5.6–6.3 |
| Equivalent weight [1] | 58.5–61.3 |

Specifications:
   Total titratable amine (aqueous) meq./gm.—16.4 min.

[1] By aqueous titration to a pH of 3.

Chemical Constituents

An investigation of the major chemical constituents contained in Amine AL-1 has given the following approximate results:

| Chemical name | Formula | Percent of total |
|---|---|---|
| Diethylenetriamine | $NH_2CH_2CH_2NHCH_2CH_2NH_2$ | 0–2 |
| N-aminoethylpiperazine. | $NH_2CH_2CH_2N\langle{CH_2-CH_2 \atop CH_2-CH_2}\rangle NH$ | 34–38 |
| N-hydroxyethylpiperazine. | $HOCH_2CH_2N\langle{CH_2-CH_2 \atop CH_2-CH_2}\rangle NH$ | 10–12 |
| N-aminoethylethanolamine. | $HOCH_2CH_2NHCH_2CH_2NH_2$ | 10–12 |
| (N-hydroxyethylethylenediamine) | | |
| Higher homologues of above. | | 40–45 |

The technical data sheet published in 1963 by Retzloff Chemical Company relative to its product L-1599, a commercially available form of mixed di and tri aminoethyl glyoxalidine that can be used in Example I, identifies it as "black viscous liquid, amine equivalent 211, acid number 4." Another data sheet published in 1963 by this same company relative to its product Retzamine 211, a later name for L-1599, identifies it as a cationic surface active agent known chemically as imidazoline or glyoxalidine and gives the following table of solubilities:

Solubility:

| | |
|---|---|
| 10% in water | Insoluble. |
| 50% in water | Do. |
| 10% in IPA | Soluble. |
| 50% in IPA | Do. |
| 10% in H.A.N. | Do. |
| 50% in H.A.N. | Do. |
| 10% in toluene | Do. |
| 50% in toluene | Do. |
| 10% in kerosene | Do. |
| 50% in kerosene | Do. |

NOTE.—IPA refers to isopropyl alcohol and H.A.N. refers to heavy aromatic naphtha.

A further data sheet published in 1963 by the same company relative to this same product Retzamine 211 gives the following additional properties:

Viscosity at 77° F.—18,000±2000 centistokes
Spec. gravity—0.97 at 60° F.
Lbs. per gal.—8.1 at 60° F.
Pour point—55–60° F.
pH(5% soln)—Approx. 11
Acid number—6 Max.
Amine equivalent—211–221
Relative solubility number—11.5–12.0

The structural formula of the monomer amino ethyl glyoxalidine is where R' is the usual alkyl group in the 2 position. From the amine equivalent, i.e. 211, for product L-1599 or Retzamine 211, it is easily calculated that the carbon count of the R' group in this product is of the order of up to $C_{22}$ or a little less taking into account the activity factor. A typical sample of Retzamine 211 would be a mixture of the di-imidazoline:

and the tri-imidazoline wherein R" is mostly $C_{34}$, and R''' is mostly $C_{51}$.

The relative proportions of the di-imidazoline and tri-imidazoline is immaterial but may be assumed to be nine parts di-imidazoline and one part tri-imidazoline The preparation of the monomer aminoethyl (alkyl) glyoxalidine is described in Sterlin's U.S. Pat. 2,945,821 wherein it is stated that: "When the glyoxalidine is derived from diethylene triamine the resultant product contains an aminoethyl group in the 1 position." The production of di-imidazolines from dibasic acid and amines is described in Chemical Reviews for August 1954 (vol. 542) page 595. By the use of tribasic acid the tri-imidazoline is obtained, e.g., as described in U.S. Pat. 2,194,419 issued in 1949 to Chevala wherein it is stated that "compounds containing in the molecule two or more cyclic acid amidine radicals which are connected by organic radicals bound to the mu-position of the cyclic radicals (by mu-position the nuclear carbon atom is designated which stands between the two nitrogen atoms) the ring comprising the amidine group having but one double bond, such as imidazolines . . . may be prepared by heating at an elevated temperature, preferably at a temperature above 200 deg. C., a di- or poly-basic carboxylic acid, . . . with a mixture of primary or secondary 1, 2- or 1,3-diamines . . . ".

Retzanate 93 is described in the brochure of Retzloff Chemical Company published prior to May 1, 1967, as follows:

"Emulsifier and detergent for industrial degreasers, dry cleaning formulations, oil soluble, solubilizer for water in aliphatic solvents," and the following chemical and physical description thereof is there given:

Alkyl amine sulfonate

Appearance—amber liquid
Pour point ° C.—4
Flash point ° F.—122
Spec. gravity 25/20—1.020
Density 25/30—8.94

Solubility 10%

Water—gel
Isopropyl alcohol—soluble
Heavy aromatic naphtha—soluble
Kerosene—soluble Retzanate 93 is produced by neutralizing dodecyl benzene sulfonic acid with isopropyl amine.

Referring again to Example I, items 3, 7, 8 and 4 will be recognized as the ammoniacal compounds and the carboxylic acid constituting the inhibitor. Item 5 is the organic solvent system in which together with the water of the weighting fluid the inhibitors are dispersed. Item 2 constitutes the weighting material and Item 1 is the solvent therefor. Item 5 is also the primary coupling agent, and Item 9 serves to disperse the inhibitors in the water and alcohols and is also a coupling agent. It is to be appreciated that many of the other items assist in coupling the inhibitor formulation to the weighting material. Item 6 helps to neutralize the acid, the formulation otherwise being corrosively acidic due to the use of acid for the weighting material.

The physical properties of the treating material of Example I are approximately as follows:

Density—10 lb./gal.
Viscosity—1300 centipoises at 75° F. on a Brookfield viscosimeter
Flash point—170° F.
Pour point—30° F.

The composition of the treating material can be varied considerably using the particular constituents there named. In addition, other constituents can be substituted, as will next be discussed.

For the inhibitor formulation, any of a variety of water insoluble carboxylic acids and/or ammoniacal compounds such as, for example: mono-, di-, tricarboxylic acids, amines, diamines triamines, polyamines, imidazolines, amine polymers, amidoamines, oxazolines, and any of the other types of water insoluble organic inhibitors previously mentioned may be used. The inhibitor component of the treating fluid functions by forming a persistent film over the metal to be protected, thereby keeping the metal out of contact with the corroding substance.

Any suitable vehicle for the solvent system for the inhibitor may be used, e.g., alcohol, naphtha, water. If water is the sole vehicle, a dispersing agent may be used. Dispersing agents that are suitable, both in water and other vehicles, include:
 (a) Sulfonates:
 (b) Oxalkylated alkyl phenols;
 (c) Polyols and esterified polyols from 500 to 20000 molecular weight.

The weighting material should be soluble in water or dispersible in water, so that the corrosion inhibitor formulation will be freed therefrom when the treating fluid contacts the well water. Other important factors involved in the choice of particular weighting material are high density and high water solubility so that a high density treating fluid can be provided; good couplability to the inhibitor formulation, and lack of undesirable side effects such as emulsification or corrosion production. Low cost is, of course, a prime factor.

To provide a well treating fluid in a sour well, the weighting fluid should be chosen so as either not to react with the H$_2$S of the sour well fluid or else so that the reaction product is soluble in the oil or water or in any event so that neither the weighting fluid nor any reaction product excessively emulsifies the oil and water of the well fluid.

Suitable types of weighting material include ammonium salts, sugars, polyols, weak acids and alkyl-arylsulfonates. Suitable ammonium salts are ammonium nitrate and ammonium sulfate. Sucrose is an example of a satisfactory sugar. Amongst the polyols, ethylene glycol, propylene glycol, glycerine, sorbitol, polyhydric alcohols, and other polyol products prepared from ethylene oxide, propylene oxide, and similar oxides having densities of at least 9 lbs./gal. are suitable. Hydrogen xylene sulfonate (xylene sulfonic acid) and sodium xylene sulfonate are examples of suitable hydrogen-and-metal-alkyl-aryl sulfonate type weighting material. Other metals than sodium could be substituted for the hydrogen and other alkylaryl structures than xylene could be used. Included amongst the weak acids are phosphoric acid (which may be fortified with P$_2$O$_5$), citric acid and tartaric acid.

The primary coupling agent for coupling the inhibitor formulation to the weighting material will usually be one of the alcohols. It is also to be borne in mind that the components selected for the inhibitor formulation and the weighting material may assist in the coupling thereof. In Example I the sulfonic acid functions as a coupler by reacting with the non-water soluble amines to render them more easily dispersible in water.

PREPARATION OF TREATING FLUID

The following is an example of a method for preparing the well treating fluid according to the invention, reference being made to the fluid composition of Example I:

(1) Place the water, phosphoric acid, and morpholine bottoms in a mixing tank and blend for 10 minutes.

(2) Add the petroleum oil oxidate and mix for 10 minutes.

(3) Add the butanol high boilers and mix for 10 minutes.

(4) Sparge with anhydrous ammonia until the pH is 7. It is preferred to do this slowly enough so that the temperature does not exceed 130 degrees F.

(5) Add the HDA and mix 10 minutes.
(6) Add the AEG and mix 10 minutes.
(7) Add the DBSA and mix for 20 minutes.

The treating fluid can also be prepared adding the materials in different order. Preferably all steps should be performed slowly enough that the temperature does not exceed 130 degrees F.

The resultant treating material is a stable liquid product that does not separate in storage. Furthermore, it can fall through thousands of feet of oil without separating. After falling through a few thousand feet of water, however, the intermingling and complexing of the inhibitor formulation with the weighting material is broken and the inhibitor portion of the treating fluid is released from the remainder, which is principally, though not altogether, the weighting material.

Figure 1:
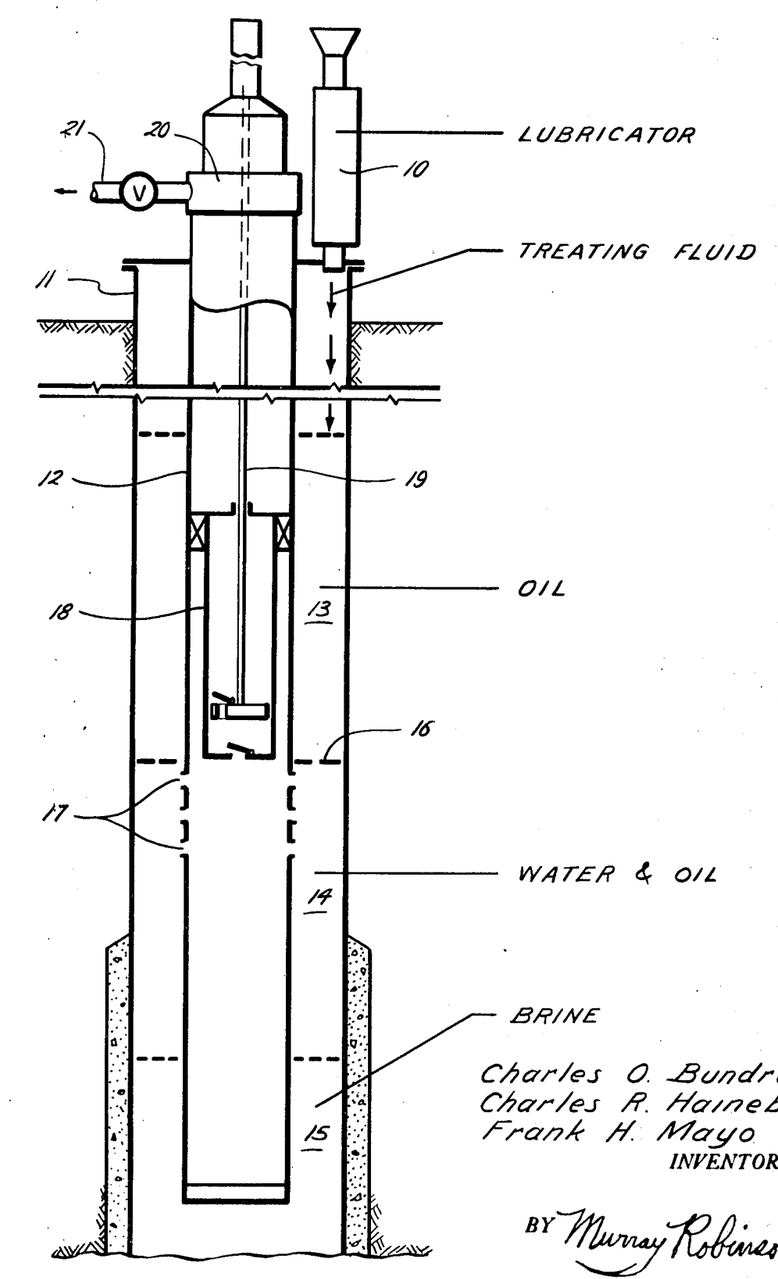
The drawing is a schematic view illustrating a method of use of the invention in a pumping well.

The treating fluid of the present invention is easily used. As shown in FIG. 1, a lubricator 10 is connected to the casing 11 of pumping wells (or to the tubing 12 if the well is flowing). The treating fluid is introduced into the lubricator and the lubricator closed to atmosphere. The lubricator is then opened to the well, pressure in the well and lubricator equalizes, and the treating fluid falls into the well. The treating fluid falls through the dead oil 13, live well fluid 14, and into the brine 15 at the bottom of the well. The weighting material decouples from the inhibitor and the latter rises to interface 16 where it enters the tubing 12 through perforations 17. The inhibitor rises with the well fluid, coating the pump 18, rods 19, tubing 12, tree 13, flowline 21, etc. Because the inhibitor is water insoluble and preferably only dispersible in oil, the flowing well fluid does not rapidly wash the inhibitor away.

In the case of flowing wells, the well will be shut in before the treating fluid is put in the well and the well will usually be shut in for up to 24 to 48 hours to allow the inhibitor to separate from the weighting material. Although most of the inhibitor will separate from the weighting material within two or three hours, depending upon the temperature, turbulence, and water content of the well fluid, it has been observed that rate of corrosion, as measured by iron content in the well fluid, continues to drop in some wells for two or three months after treatment, indicating that some additional inhibitor is separating out even at that late date.

Generally speaking, the subject treating fluid can be used to treat gas wells by means of pumping, pouring or lubricating the inhibitor down the tubing or casing of flowing or pumping wells. Gas wells that are not adapted to squeeze type treatments because of reservoir characteristics can be treated with the subject fluid. Examples of the latter type of wells are those that require extremely high pressure to displace the inhibitor into the formation and wells in which a squeeze type treatment may tend to kill the flow from the well. The subject fluid can be used to treat the annular area of dual and triple and other multiple completion wells. The treating fluid of the invention is especially suited to treat high fluid level pumping sour wells.

The treating fluid of the invention possesses the property that when it is immersed in water or brine, the weighting material will slowly diffuse into the water and release the inhibitor concentrate. The inhibitor concentrate will then rise to the oil water interface. It will also enter the tubing perforations, if the well is a producing, pumping well. The treating fluid does not contain any organic halides, arsenic, or other substance that would be detrimental to oil refineries. The treating material can be made to have densities in the range of about 7.5 to in excess of 12 pounds per gallon, e.g., up to 15 lb./gal or more.

The following are examples of formulations using other types of corrosion inhibitors, weighting materials, solvent systems, and coupling agents, all being especially suited for use in sour wells.

In the following examples, the numbers in the left-hand column are percentages by weight, a range being given first, followed by a preferred figure. The following abbreviations are used:

IPA: Isopropyl alcohol.

PWO: Petroleum wax oxidate 75% to 95% strength (sold by Texaco under the name TX3650 acid).

HDA: Crude N-hydroxyethylethylene di-amine 75% to 95% strength (sold by Jefferson Chemical Co. as Amine AL-1).

AEG: Mixed di- and tri-amino-ethyl glyoxaldines, 75% to 95% strength (sold by Retzloff Chemical Co. as Retzamine 211) (or resinous amines sold by Textilana as PR 7475).

DBSA: Dodecyl benzene sulfonic acid, 99% strength.

BHB: Butanol high boilers, i.e., residue bottoms from production of butyl alcohol, 100% strength (sold by Dow Chemical Company).

EXAMPLE II

| | | |
|---|---|---|
| 5-20 | 10 | IPA. |
| 2-20 | 8 | PWO. |
| 2-15 | 7 | Fatty piperazine amine (Textilana FPA). |
| 15-80 | 25 | Ethyl phosphoric acid. |
| 25-80 | 50 | Phosphoric acid. |

EXAMPLE III

| | | |
|---|---|---|
| 5-20 | 10 | IPA. |
| 2-20 | 9 | PWO. |
| 2-12 | 6 | Tallow diamine (Armour, Duomeen T). |
| 15-80 | 25 | Ethyl phosphoric acid. |
| 25-80 | 50 | Phosphoric acid. |

EXAMPLE IV

| | | |
|---|---|---|
| 2-20 | 10 | IPA. |
| 2-16 | 7.5 | Sebacic acid residue (Rohm & Haas, VR-1 Acid). |
| 2-15 | 7.5 | Polymer amine (Textilana, HA). |
| 50-80 | 75 | Butyl phosphoric acid. |

EXAMPLE V

| | | |
|---|---|---|
| 5-20 | 10 | IPA. |
| 2-16 | 7.5 | Sebacic acid residue (VR-1 acid). |
| 2-15 | 7.5 | Polymer amine. |
| 25-75 | 50 | Butyl phosphoric acid. |
| 15-40 | 25 | Ethyl phosphoric acid. |

EXAMPLE VI

| | | |
|---|---|---|
| 4-20 | 9.5 | PWO. |
| 2-10 | 3.0 | HDA. |
| 1-10 | 1.5 | AEG. |
| 1-10 | 1.1 | DBSA. |
| 2-30 | 19 | IPA. |
| 20-8 | 65.9 | Polyol (Atlas Chemical Ind. Inc. Sutro 250). |

EXAMPLE VII

| | | |
|---|---|---|
| 4-20 | 9 | PWO. |
| 1-12 | 3 | HDA. |
| 1-10 | 1.5 | AEG |
| 1-16 | 1.1 | DBSA. |
| 2-30 | 3.7 | IPA. |
| 20-80 | 69.4 | Sorbitol solution in water, 70% by weight. |

EXAMPLE VIII

| | | |
|---|---|---|
| 5-20 | 10.0 | PWO. |
| 1-12 | 4.2 | HDA. |
| 2-20 | 8.3 | Morpholine bottoms (Jefferson Chemical Co. Amine C-6). |
| 1-10 | 2.5 | DBSA neutralized with iso-propyl-amine (Retzanate 93, Retzloff Chemical Co.). |
| 1-10 | 1.7 | AEG. |
| 2-70 | 12.5 | BHB. |
| 20-80 | 60.8 | Sorbitol solution in water, 70% by weight. |

EXAMPLE IX

| | | |
|---|---|---|
| 2-20 | 10 | IPA. |
| 3-18 | 10 | PWO. |
| 1-14 | 5 | HDA. |
| 25-90 | 75 | Ammonium chloride saturated solution in water. |

EXAMPLE X

| | | |
|---|---|---|
| 2-20 | 10 | IPA. |
| 3-18 | 10 | PWO. |
| 1-14 | 5 | HDA. |
| 25-90 | 75 | Ammonium nitrate, saturated solution in water. |

EXAMPLE XI

| | | |
|---|---|---|
| 3-10 | 5.7 | Oil oxidate, sold by Texaco as TC-5926, consisting of a mixture of organic acids and esters, and also containing alcohols, ketones, hydroxy and keto acids and estolids, lactides and lactones. |
| 3-18 | 11 | HDA. |
| 1-5 | 1.5 | AEG. |
| 0-5 | 1.5 | DBSA. |
| 3-15 | 7.3 | Methylalcohol. |
| 50-85 | 73 | Sucrose solution in water, 11 lbs. of sucrose per gal. of water. |

The technical sheet published in 1963 by Texaco, Inc. relative to its TX3650 acid, a commercially available form of petroleum wax oxidate which can be used in the examples, identifies it as being a "complex mixture composed primarily of organic acids and esters but also containing alcohols, ketones, hydroxy and keto acids, estolides, lactides and lactones." The same data sheet gives the properties of petroleum wax oxidate as follows:

| | |
|---|---|
| Pounds/gallon at 60° F. | 9.0 |
| Viscosity at 210° F., SUS | 160 |
| Neut. No. | 225 |
| Sap. No. | 420 |
| Unsap., wt. percent | 6 |
| Ash, wt. percent | 0.1 |
| Flash, ° F. | 280 |
| Pour point | 70° F. |

As noted in the aforementioned patents, the organic acids (and esters thereof) resulting from the oxidation of petroleum components are of high molecular weight, e.g., in the range of $C_{10}$ to $C_{20}$.

TX 3650 acid is made by oxidizing paraffin. Assuming, as in the case of TC5926 acid, that the TX3650 acid is pure monoacid, the molecular weight of the acid as computed from the neutralization number (56.1) (1000)/(225)=229. This corresponds to the monoacid $C_{13}H_{37}$COOH. Generally speaking, carboxylic acids in the range of 10 to 30 carbon atoms in the monomer are suitable for the acid component of the inhibitor formulation. Polymers of such acids may also be used.

Petroleum wax is defined in Webster's Third New International Dictionary, copyright 1961, 1964 printing, at page 1691, as being "a wax obtained from petroleum compare: ceresin, microcrystalline wax, paraffin." Ceresin is defined at page 366 of the same work as being "a white yellow hard brittle wax made by purifying ozokerite, and used as a substitute for beeswax; also, a petroleum wax (as paraffin wax) having similar properties."

Microcrystalline wax is defined on page 1427 of the same work as "any of various plastic materials that are obtained from petroleum (as by refining of tank bottoms from crude oil or by removal with a solvent of oil from crude petroleum) that differ in general from paraffin waxes in having higher melting points and viscosities and much finer and less distinct crystals . . . compare petroleum wax."

Paraffin wax is defined on page 1636 of the same work as "a waxy organic substance that is white, translucent, odorless, and tasteless when pure, that is obtained especially from distillates of wood, coal, or now usually petroleum or shale oil, that is a complex mixture of hydrocarbons principally of the methane series . . ."

The oxidation of petroleum wax to produce organic acid is well defined in the literature. See for example the aforementioned U.S. Pat. 2,599,385 to Gross et al. wherein it is stated in col. 2, lines 16–19, that, "These oxidized mineral waxes are known materials. They are prepared, usually, by blowing air through molten mineral wax at a temperature of about 220 to 330 deg. F., usually with the use of a catalyst such as potassium permanganate, cobalt salts, manganese or iron soaps, or other oxidation catalyst for a period of time sufficient to raise the saponification value to the required level. Any of the available mineral waxes may be used to produce these oxidized products, including paraffin wax, microcrystalline wax produced from lubricating oil fractions, and high melting point microcrystalline waxes obtained from crude oil or tank bottoms." The production of petroleum wax oxidate is also described at col. 2, lines 22–35 of U.S. Pat. No. 2,862,803 issued in 1958 to Oosterhout as follows: "High acid content macrocrystalline wax oxidates of low unsaponifiable content and excellent color characteristics are obtained by reacting a deoiled paraffin wax containing less than 5 percent oil with air in the presence of a catalyst at an air feed rate of about 10 to 50 cubic feet per pound of wax per hour at a temperature between 230 and 290 degrees F. and at a pressure of about 30 to 300 pounds per square inch absolute. The wax oxidates obtained in a period of about 8 hours by use of the prescribed processing conditions are characterized by a Neut. No. above 200, and usually between 200 and 300; a Sap. No. above 282 and usually between 282 and 430; a Neut. No. to Sap. No. ratio greater than 0.6, usually 0.61 to 0.70, and an unsaponifiable content less than 41 percent." TX3650 acid is a product made by the general process of the aforesaid Oosterhout patent, the slightly lower (.536) ratio of the Neut. No. to Sap. No. is the result of a slight decrease in the time of oxidation.

The technical bulletin published by Textilana Corporation prior to May 1, 1967, relative to its product, "Textamine FPA," identifies it as follows:

Chemical and physical properties

Type—Fatty piperazine complex
Amino groups—Secondary and tertiary
Amine equivalent weight:
    280 average at pH 3.5 *
    440 average at pH 7.0
Acid number—Below 5
Pounds per gallon—7.96 at 26° C.
Physical appearance—Viscous liquid or fluid paste
Odor—Ammoniacal
Color FAC—17–23
Amine content—95% minimum

*Sample dissolved in 100 cc. isopropanol and 50 cc. distilled water. Titrated with N/2 HCl, indicator bromophenol blue.

From the above, it is apparent that FPA is acylated N-alkyl-piperazine and that a general formula for the material is where $R_n°$ is an acylated fatty nucleus containing $n$ carbon atoms and where $n$ is of the order of 14 to 30. Specifically in FPA, $R_n°$ is a complex of where R is a higher fatty nucleus.

The pamphlet "Duomeens," published in 1955 by Armour and Company, states:

"Duomeen" is the trademark registered by the Armour Chemical Division to designate its group of N-alkyl trimethylene diamines. It has this general formula:

The 'R' represents an alkyl group derived from a fatty acid, identification of which is as follows:

Duomeen C—Coconut
Duomeen S—Soya
Duomeen O—Oleic
Duomeen T—Tallow

The Duomeens are industrial or technical grade chemicals with an amine content of approximately 83% calculated as diamine. Duomeen C and Duomeen O are liquids, while Duomeen S and Duomeen T are fluid pastes.

Approximate melting ranges for the Duomeens (Degrees centigrade)
Duomeen C ______________________________ 18–26
Duomeen O ______________________________ 20–26
Duomeen S ______________________________ 32–40
Duomeen T ______________________________ 35–42

As the structural formula indicates, these compounds contain both primary and secondary amine groupings. They are, therefore, strong organic difunctional bases and exhibit greater cationic activity than their corresponding primary amines. These diamines have adsorption characteristics which enable them to form strongly bonded organophilic or hydrophobic films on surfaces of metals, textiles, plastics, silica, minerals, cellulosics, etc.

The Duomeens are prepared by the reaction of the primary amine with acrylonitrile, followed by hydrogenation.

The same pamphlet gives the following chemical and physical properties for Duomeen T:

|  | Min. | Max. |
| --- | --- | --- |
| Iodine value | 32 | 50 |
| Percent active Duomeen | 83 |  |
| Primary amine, percent | 38 |  |
| Secondary amine, percent | 38 |  |
| Moisture, percent |  | 1 |
| Color, FAC |  | 19 |
| Melt point | 20 | 26 |
| Combining weight | 355 |  |
| Specific gravity at 25° C |  | 0.841 |
| Viscosity (cps.) at: |  |  |
| 25° C |  | 880 |
| 30° C |  | 70 |
| 35° C |  | 10 |
| Appearance at 25° C |  | (¹) |

¹ Heavy liquid.

The Duomeens are water insoluble liquids or pastes. In order to effect water solubility, they can be converted to either the mono or di substituted salts of acetic, lactic, adipic, or hydrochloric acids, to name a few. The mono salts have only one-half of the available amine content neutralized; the di substituted salts have the total amine content neutralized. The Duomeen Salt Formation Table shows the part by weight of acid required to form the corresponding salt using 100 parts of 80% active Duomeen. Column four in that table lists the equivalent weight of Duomeen which will react with an equivalent weight of any acid to produce the respective di salts. Mono salts are obtained by using one-half equivalent of acid per equivalent of Duomeen.

The same pamphlet gives the following additional chart:

DUOMEEN T SALT FORMATIONS

| Theoretical molecular weight | Combining molecular weight 80% active Duomeen | Equivalent weight basis, 80% active Duomeen |
|---|---|---|
| 320 | 800 | 200 |

Parts by weight of acid required to form salts (100 parts of 80% active "Duomeen")

| | 36% HCl | Glacial acetic | Adipic | Naphthenic (330 mol. wt.) | Oleic |
|---|---|---|---|---|---|
| Mono | 25.5 | 15.0 | 18.2 | 82.5 | 70.0 |
| Di | 50.5 | 50.0 | 36.3 | 165.0 | 140.0 |

Solubilities at 25° C.

| | Water | Naphtha | Mineral oil | Isopropanol |
|---|---|---|---|---|
| Straight | Insol | Sol. at 25° C. | Insol | Sol. |
| Diacetate | Sol | Insol | Insol | Insol. |
| Dioleate | Insol | Sol | Sol | Sol. |

The same pamphlet gives the following table of specific gravity for Duomeen T:

| Temperature, ° C. | Specific gravity |
|---|---|
| 100 | .793 |
| 95 | .796 |
| 90 | .799 |
| 85 | .803 |
| 80 | .806 |
| 75 | .810 |
| 70 | .813 |
| 65 | .817 |
| 60 | .821 |
| 55 | .825 |
| 50 | .829 |
| 45 | .833 |
| 40 | |

A corrosion inhibitor of the acid type useful in forming well treating fluids according to the invention is commonly known as VR-1 acid (Rohm & Haas Co.). This acid is referred to by name in U.S. Pats. Nos. 2,839,465 issued in 1953 to Jones, 2,941,943 issued in 1960 to Kirkpatrick, and 2,945,821 issued in 1960 to Sterlin. As noted by Jones, the VR-1 acids are polybasic acids obtained as a by-product from the caustic fusion of castor oil. They have an average molecular weight of about 1000 and an average of about 2 carboxylic acid groups per molecule. They are conveniently described as the non-volatile residue, containing long-chained carboxylic acids, remaining from the vacuum distillation of by-product acids obtained in the preparation of sebacic acid from castor oil by treatment with alkali. These VR-1 acids are described in more detail in U.S. Pats. 2,267,269 issued to Cheetham et al. and 2,471,230 issued to McKeever. As noted in the Sterlin patent, VR-1 acid consists principally of polymerized linoleic acid, contains dimerized, trimerized and higher polymerized linoleic acid, and is a dark amber, rather viscous liquid. A typical sample of VR-1 acid has the following analysis:

Acid number—150
Iodine number—30
Saponification number—172
Unsaporfiable matter—3.7, 3.5%
Moisture content—0.86%

The Kirkpatrick patent gives a like description and analysis of VR-1 acid. Linoleic acid has the chemical formula $C_{17}H_{31}COOH$.

A corrosion inhibitor of the amine type useful in forming well treating fluids according to the invention may be designated Amine A. Amine A is prepared by reacting the following materials.

| | Percent |
|---|---|
| VR-1 acid | 66.15 |
| Diethylene triamine ($NH_2$—$C_2H_4$—NH—$C_2H_4$—$NH_2$) | 21.85 |

The reaction is carried out at a temperature of approximately 410° F. until an amine equivalent of about 211 is attained. A light gas sparge using nitrogen or some other enert gas is believed to be helpful. From its mode of preparation using diethylene triamine and polylinoleic acid, and its amine equivalent of 211, Amine A will be recognized as the mixed di- and tri-1-amino ethyl, 2-heptadecyl, 2 imidazoline (Retzamine 211) of Example I. The material is mostly in diimidazoline.

Another material that may be used in preparing a well treating fluid according to the invention may be called Amine 13. Amine 13 is prepared by reacting 560 grams of refined tall oil (almost pure oleic acid) with 189 grams of tetraethylenepentamine: The reaction is carried out for four hours at 490° F. to drive off the water of condensation. The result is a polyimidazoline in accordance with the aforementioned Blair et al. Pat. 2,466,517. Textilana HA, or polymer amine, may be the same material as Amine A-13 described above.

Sutro 250 polyol is described in a product information bulletin published at Atlas Chemical Industries, Inc. as follows:

POLYOL MIXTURE

General characteristics

Classification—Polyhydric alcohol
Form @ 25° C.—Yellow liquid with solids
Specific gravity @ 25° C.—Approx. 1.3
Viscosity @ 55° C.—Approx. 202 cps.
Flash point—Above 300° F.
Fire point—Above 300° F.
Hydroxyl number (dry basis)—Approx. 1800
Molecular weight (dry basis)—Approx. 125
Effective equivalent weight (dry basis), based on typical alkyd reaction—40

Solubilities (a) Soluble water, alcohol, and glycerine.
(b) Insoluble in vegetable and mineral oils.

Standard specifications

Water content, percent—4.5–5.5
Reducing sugar, percent (dry basis)—0.1 max.
Sulfated ash, percent (dry basis)—0.1 max.

The general formula for polyol is $$C_nH_{2n+2-y}(OH)_y$$

where $y$ is the number of hydroxyl groups per molecule and $n$ is the number of carbon atoms per molecule. From the above data for "Sutro 250" it is seen that its typical formula is: $C_4H_6(OH)_4$, which may be called butanetetrol.

Textamine C-18 is described in the technical bulletin of Textilana Corporation published prior to May 1, 1967 as follows:

Chemical and physical properties

Type—Fatty Amido Diamine
Fatty acyl group—C-18 unsaturated (oleic-linoleic)
Amino groups—Primary and secondary
Amine equivalent weight—210 average at pH 3.5 *—320 average at pH 7.0

*Sample dissolved in 100 cc. isopropanol and 50 cc. distilled water. Titrated with N/2HCl, indicator bromophenol blue.

Acid number—Below 5
Specific gravity—0.935 at 25° C.
Pounds per gallon—7.8
Physical appearance—Viscous liquid or fluid paste
Odor—Ammoniacal
Color FAC—15–19
Amine content—95% minimum From the foregoing, it is apparent that the formula for Textamine C-18 may be written as where $H_{31/33}$ indicates that the fatty acyl group may be derived from either linoleic or oleic acid. Since the amido nitrogen group does not titrate, there are only the primary and secondary amine groups that affect the amine equivalent number. The amine equivalent is the weight of a compound that has the same basicity as one mole of ammonium hydroxide or in other words, the molecular weight of the compound per active amine group. The molecular weight of Textamine C-18 is therefore typically 210 (the amine equivalent) multiplied by 2 (the number of active amine groups per molecule) multiplied by 95% (the amine content) or $(420)(95\%)=400$. Since according to the above formula the molecular weight of Textamine C-18 except for the $C_yH_{2y}$ and $C_xH_{2x}$ groups is 310, we have $C_xH_{2x}+C_yH_{2y}=400-310=90$.

Assuming $x=y$ we have $2(12x+2x)=90$
$28x=90$
$x=3=y$

Such an average value of $x$ and $y$ would usually be made up of values ranging from 2 to 6.

The well treating fluids whose percentage composition is set forth in Examples II through XI may be prepared in a manner similar to that of Example I. With respect to Examples II through V, and IX, no dispersing agent is used, the specified corrosion inhibitors being sufficiently soluble in isopropyl alcohol which then serves as both solvent system for the corrosion inhibitor and coupling agent to tie in the weighting material.

The following is an example of a well treating fluid embodying the invention in which the corrosion inhibitor formulation includes only ammoniacal compounds, there being no carboxylic acid in the formulation:

EXAMPLE XII

| Percent by weight: | Material |
|---|---|
| 8.5 | BHB. |
| 8.5 | Methyl alcohol. |
| 14.0 | Textamine C-18 (supra). |
| 69.0 | Citric acid solution, including 59% by weight of citric acid and 41% by weight of water. |

The following is an example of a well treating fluid embodying the invention in which the corrosion inhibitor formulation includes only carboxylic acids, there being no ammoniacal compounds in the formulation.

EXAMPLE XIII

| Percent by weight: | Material |
|---|---|
| 8.3 | BHB. |
| 8.3 | Methyl alcohol. |
| 13.6 | TC-5926 (supra). |
| 4.8 | DBSA. |
| 57.3 | Citric acid solution (same as in Example XII). |
| 7.7 | Nonylphenol adduct with 12 mols. ethylene oxide per mol. of phenol. |

For example XII and XIII, the general method of preparation is the same as for the other examples.

As noted in the aforementioned U.S. Pat. No. 2,756,211 issued in 1956 to Jones, combinations or complexes of an amine and an organic acid falling within certain molecular weight ranges effect iron corrosion inhibition in oil wells in the presence of both oxygen and hydrogen sulfide. Some authorities believe that the amine-acid combination is a salt, others describe it as being merely a complex. Jones refers to a variety of amines that will suit his purpose, but prefers straight-chain primary octadecyl amine. For the acid portion of his complex he prefers straight chain carboxylic acid containing from 5 to 20 carbon atoms, preferably that obtained from the liquid phase partial oxidation of normally liquid fractions of petroleum, such as kerosene, as described in U.S. Pat. No. 1,690,769 to Burwell. Acid-amine complexes as described in the Jones patent are, as noted at the beginning hereof, among the iron corrosion inhibitors that can be weighted according to the invention. His amine-acid complexes are similar to the 1 amino-ethyl, 2-heptadecyl imidazoline plus petroleum oil oxidate combination set forth in Example I hereof.

As noted by Jones, 2,756,211, at col. 8, lines 41 to 44, such amine-acid complexes can be dissolved in solvents such as "benzene, alcohols, ethers, esters, ether alcohols available under the trademark Cellosolves ... " The latter is a Union Carbide Company trademark. An example of the latter is Butyl Cellosolve which is an ether alcohol of the formula $C_4H_9OC_2H_4OH$ and may be called butylethanol ether. Such solvents are similar to those used in Example I, i.e. butanol high boilers.

In the aforementioned Blair Pat. No. 2,598,313, there is described a class of iron corrosion inhibitors which may be described as acylated polyamines or amidoamines. The inhibitors are obtained by reacting a polyamine with a source of an acyl radical, e.g. an amide of a carboxylic acid. The resulting compound contains both amino and amido groups. In Example VI of this Blair patent an inhibitor is prepared using olive oil and diethylenetriamine. A similar inhibitor may be prepared using tall oil (oleic acid, $C_{17}H_{35}COOH$) and will be designated as Amido-Amine 6T. This material is prepared as follows:

100 parts by weight of tall oil and 100 parts by weight of diethylenetriamine are heated to about 180-200 deg. C. until a test portion of the reaction mixture is soluble in dilute hydrochloric acid. After distilling off the excess of diethylene triamine, advantageously under reduced pressure, there remains a strongly viscous mass.

A further example of a treating fluid in accordance with the invention, using a xylene sulfonate as the weighting material is as follows:

EXAMPLE XIV

Sodium xylene sulfonate (50% active solution in water)—80 percent wt.
Polyoxyethylene sorbitol hexa-oleate (such as Atlas Chem. Ind. Inc. G-1096)—8%
VR*1 acid—9.5%
Amine A—2.5%

This is a liquid having a density of 9.5 lb. per gallon.

In all of the examples given hereinabove the percentage composition can be varied somewhat, a criterion for a useful formulation being a long shelf life, for many formulations even though compatible initially will fall apart after a brief period of time.

It is to be noted that in the inhibitor formulation of many of the foregoing examples the dedecylbenzenesulfonic acid used as a coupling and dispersing agent is neutralized, e.g., by Amine A. Although sulfonic acid is referred to in the aforementioned Blair Pat. 2,756,211 as suitable for his amine-acid complex type inhibitor, sulfonic acid alone is corrosive.

Other iron corrosion inhibitors may be weighted in accordance with the invention. In Jones Pat. No. 2,756,-

211, Table II, there is listed an acid amine complex using cyclohexyl amine and Alox 425 acid, the latter being an acid obtained by the partial oxidation of normally liquid hydrocarbons and containing acids having 10 to 12 carbon atoms per molecule on the average. Although the results obtained by Jones with this inhibitor were not highly desirable, a somewhat similar but better inhibitor may be weighted according to the invention.

The foregoing examples illustrate how a wide variety of water insoluble iron corrosion inhibitors can be weighted in accordance with the invention to produce high density well treating fluids. High density means not merely that the material is denser than oil or high pressure gas but that it is materially higher in density than such petroleum materials, that is, higher in density by a factor of the order of at least 25% so that the treating fluid will fall rapidly through the oil or gas. Such high density treating fluid will therefore also be denser than the salt water in the bottom of the well and will fall toward the bottom of the well. If the weighting material were not releasably coupled to the inhibitor formulation, the inhibitor would remain at the bottom of the well and do no good. The fact that the weighting material decouples from the inhibitor formulation in the presence of an excess of water is therefore a very important feature of the invention. On the other hand, it is perhaps equally important that the inhibitor formulation and weighting material be stably coupled prior to use so that the treating material can be stored and need not be mixed at the well site where labor is scarce and working conditions usually less desirable.

It is to be observed that the organic acid and the total of the high molecular weight amines are in equal mole proportions. This is the preferred proportion in all of the examples; although an excess of either the acid or amine component is permissible. Generally speaking, the organic acid component is usually a high molecular weight acid having eight to forty carbon molecules and may or may not be polymerized. The acid is usually largely or entirely saturated and straight chain but branched and cyclic molecular configurations are also suitable and they need not be saturated.

The ammoniacal component generally will include both a low molecular weight-amine having from 3 to 10 carbon atoms and a high molecular weight component including an imidazolene ring to which is attached a carbon chain of six to forty carbon atoms. The low molecular weight amine may be viewed as serving to neutralize the dispersant sulfonic acid, especially if these materials are added at about the same time in preparing the inhibitor formulation. At any rate, in preparing the formulation equal mole proportions of the sulfonic acid and the low molecular weight amine are preferred, although neutralization may be effected by balancing the total of sulfonic and organic acid against the total of the amines.

To produce a high density treating material having a density of at least 10 lb./gal. by coupling a weighting material composition to a corrosion inhibiting formulation, the inhibitor formulation and coupler together having a density of the order of 8 lb./gal., it is apparent that the weighting material composition must have a density in excess of 10 lb./gal. and the amount of weighting material composition required decreases with the density of the weighting material composition. For example, in a treating fluid wherein there is a 50–50 ratio of inhibitor formulation and coupler to weighting material composition, the weighting material must have a density of about 12 lb./gal., assuming no reduction in volume upon addition of the weighting material composition to the coupler and inhibitor formulation.

Using a weighting material composition having a density of 16 lb./gal., the top of the range specified hereinabove, and an inhibitor formulation and coupler having a density of 8 lb./gal., about the maximum within the aforementioned range of densities of inhibitor formulations and with usual couplers, it will be seen that in order to produce a treating fluid having a density of 10 lb./gal. the proportions by weight will be as follows:

|  | Parts |
|---|---|
| Weighting material composition (16 lb./gal.) (20%) | 1 |
| Inhibitor formulation and couple (8 lb./gal.) (80%) | 4 |
| Treating fluid (10 lb./gal.) (100%) | 5 |

In the foregoing examples the ratio of the weight of the solvent system for the inhibitor material, together with any additional coupling material, to the weight of inhibitor material varies from about 3 to 1 to 1 to 3. The maximum percentage of inhibitor material (organic acid and ammoniacal compound) is thus about 60%. The range is therefore 5¼% to 60% inhibitor material in the treating fluid. Preferably, the treating fluid includes at least 13 to 30% inhibitor material, a range corresponding to the specific proportions of all of the examples.

The term "couple" as used herein is to be understood in the sense of the definition in Webster's Second New International Dictionary published in 1943: "Couple-intransitive—3. Chem. To unite; —said of two compounds the molecules of which become joined, often with elimination of some minor component, as water . . . ."

In the present case, the weighting material composition is coupled to the inhibitor formulation; there is no appreciable loss of volume attendant to such coupling, although there is an exothermic reaction; the mechanism of the coupling is believed to be in the nature of complexing. The coupling is not the simple mechanical intermingling of an emulsion. Therefore, it may be said that the inhibitor formulation and the weighting material composition are stably coupled in single phase relationship. This coupling is stable for months, allowing the fluid to be stored without separation. Also, the coupling does not break when the fluid falls through thousands of feet of oil. But the fluid is partible in an excess of water, e.g., 2 or 3 volumes of water to one volume of treating fluid.

Throughout the various examples and other description and in the claims, the proportions, strengths and compositions are by weight.

Throughout, it is to be observed that in any of the treating fluids according to the invention, e.g., as in the foregoing examples, the addition of more coupling material, e.g., low molecular weight alcohols, will cause the fluid to separate more quickly when the fluid is introduced into the water in the well, but the fluid will still be shelf stable. On the other hand, if a relatively small amount of water, e.g., 2 or 3 volumes of water per volume of treating fluid in the foregoing examples is added to the treating fluid, it will no longer be shelf stable.

In many of the foregoing examples, it will be apparent that the dispersing agents, solvents and coupling agents are considerable denser than the inhibitors. In such cases less material serving primarily the weighting function will be required than would otherwise be necessary.

The formulations of Examples XIV and XV will, of course, be made in accordance with the same general method prescribed for the preceding examples.

While a preferred embodiment of the invention has been shown and described and several alternative formulations mentioned, many other modifications can be made by one skilled in the art without departing from the spirit of the invention.

What is claimed is:

1. A well treating fluid compatible with sour gas consisting essentially of
    a water insoluble organic iron corrosion inhibitor in an amount from 5¼% to 60% by weight,
    said inhibitor being dispersible but less than completely soluble in oil and having a density less than about 8.33 pounds per gallon, an aqueous solution of a water soluble weighting agent present in an amount sufficient to impart a density in excess of 9.9 pounds per gallon to said fluid, said weighing agent being selected from the group consisting of:

citric acid, phosphoric acid, ethyl phosphoric acid, butyl phosphoric acid, xylene sulfonic acid, and metal salts of xylene sulfonic acid, and a coupling agent to inhibit separation of said corrosion inhibitor and said aqueous solution of said weighting agent, said coupling agent being selected from the group consisting of:

methyl alcohol, isopropyl alcohol, and the residue bottoms from the production of butyl alcohol, said residue bottoms consisting of a mixture of n-butanol and mixed $C_5$–$C_{12}$ alkanols.

2. Well treating fluid according to claim 1 wherein the weighting agent is citric acid.

3. Well treating fluid according to claim 2 wherein the coupling agent consists of methyl alcohol and said residue bottoms.

4. Well treating fluid according to claim 1 wherein the weighting agent is selected from the group consisting of phosphoric acid, ethyl phosphoric acid, and butyl phosphoric acid.

5. Well tretating fluid according to claim 4 wherein the coupling agent is isopropyl alcohol.

6. Well treating fluid according to claim 1 wherein the weighting agent is selected from the group consisting of xylene sulfonic acid and metal salts of xylene sulfonic acid.

7. A well treating fluid compatible with sour gas consisting essentially of a water insoluble organic iron corrosion inhibitor in an amount from 5¼% to 60% by weight, said inhibitor being dispersible but less than completely soluble in oil and having a density less than about 8.33 pounds per gallon, an aqueous solution of a water soluble weighting agent present in an amount sufficient to impart a density in excess of 8.33 pounds per gallon but not over 9.9 pounds per gallon to said fluid, said weighing agent being selected from the group consisting of:

citric acid, phosphoric acid, ethyl phosphoric acid, butyl phosphoric acid, xylene sulfonic acid, and metal salts of xylene sulfonic acid, and a coupling agent to inhibit separation of said corrosion inhibitor and said aqueous solution of said weighting agent, said coupling agent being selected from the group consisting of:

methyl alcohol, isopropyl alcohol, and the residue bottoms from the production of butyl alcohol, said residue bottoms consisting of a mixture of n-butanol and mixed $C_5$–$C_{12}$ alkanols.

8. Well treating fluid according to claim 7 wherein the weighting agent is citric acid.

9. Well treating fluid according to claim 7 wherein the weighting agent is selected from the group consisting of phosphoric acid, ethyl phosphoric acid, and butyl phosphoric acid.

10. Well treating fluid according to claim 7 wherein the weighting agent is selected from the group consisting of xylene sulfonic acid and metal salts of xylene sulfonic acid.

References Cited

UNITED STATES PATENTS

| | | | |
|---|---|---|---|
| 2,839,465 | 6/1958 | Jones | 252—8.55 |
| 2,785,127 | 3/1957 | Shock et al. | 252—8.55 |
| 2,898,294 | 8/1959 | Priest et al. | 252—8.55 |
| 2,822,330 | 2/1958 | Riggs et al. | 252—8.55 |
| 2,999,811 | 9/1961 | Schell et al. | 252—8.55 |

HERBERT B. GUYNN, Primary Examiner

U.S. Cl. X.R.

166—310; 252—389, 391, 395, 396